UNITED STATES PATENT OFFICE.

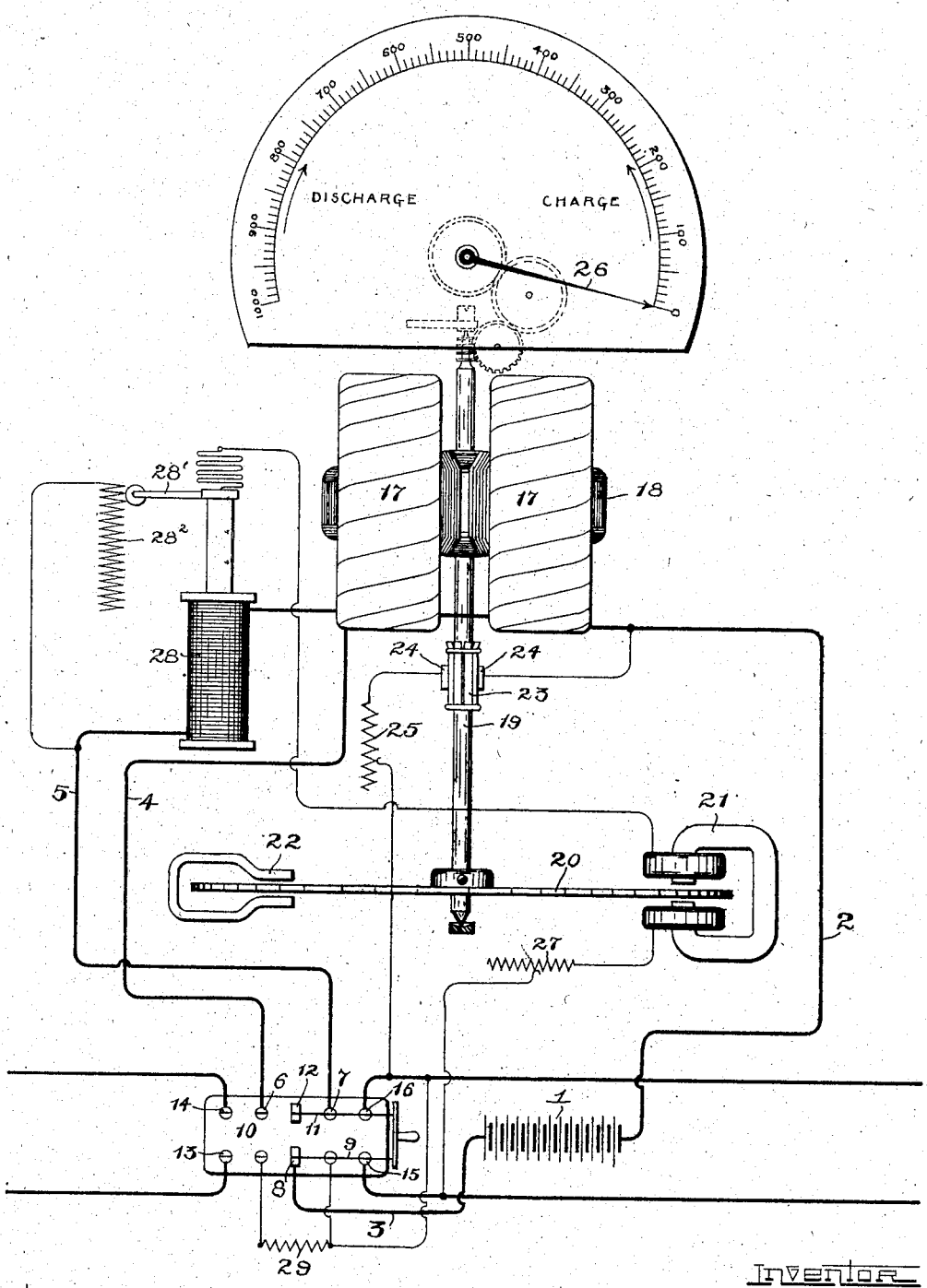

THOMAS DUNCAN, OF LAFAYETTE, INDIANA.

METER.

No. 796,059.   Specification of Letters Patent.   Patented Aug. 1, 1905.

Application filed January 8, 1902. Serial No. 88,833.

*To all whom it may concern:*

Be it known that I, THOMAS DUNCAN, a citizen of the United States, residing at Lafayette, in the county of Tippecanoe and State of Indiana, have invented a certain new and useful Improvement in Meters, of which the following is a full, clear, concise, and exact description, reference being had to the accompanying drawing, forming a part of this specification.

My invention relates to meters adapted for use in connection with storage batteries, and has for its object the provision of a meter that is adapted to rotate at different rates of speed per unit of load or energy upon variations in the rate of battery discharge.

By means of my invention the meter is caused to operate at an increased rate of speed per unit of load or energy upon an increase in the rate of discharge.

In the use of storage batteries it is well known that the output of the battery will always be less than the energy stored therein and that the battery loss will increase upon a sufficient increase in the rate of battery discharge. For example, (supposing the battery to be a one-hundred-volt battery,) if the battery is charged one hundred thousand watt-hours at its normal rate—say ten thousand watts per hour—for ten hours the total discharge at the same rate which can be made available without harm to the battery will not be more than about eighty per cent. of the energy charged into the battery with some makes of battery, this battery loss varying with different makes—that is, the battery will effectively operate at one hundred amperes for eight hours, giving out eight hundred ampere-hours (equivalent to eighty thousand watt-hours of energy) after having received one thousand ampere-hours, (equivalent to one hundred thousand watt-hours.) If the rate of discharge is increased, the total output will be diminished. For example, with certain makes of battery the energy discharge will not be over about seventy per cent. if the rate is increased to one hundred and forty amperes per hour, sixty per cent. if the rate of discharge is doubled, and forty per cent. if the rate of discharge is quadrupled.

I have provided an instrument that is adapted to compensate for the varying battery losses due to the varying rates of discharge, so that the user of the battery may know when the available energy in the battery is spent. Ordinarily a meter associated with a storage battery that is discharged at varying rates will indicate the presence of more energy in the battery than actually exists. The meter of my invention is also adapted to measure the energy that is being stored in the battery, the meter when thus associated with the charging source of current being operatively dissociated from the means that cause the meter to operate at varying rates of speed per unit of load or energy at different rates of discharge.

The meter of my invention is particularly adapted for use in connection with motors employed in operating motor-vehicles where the rate of discharge is not constant, but is liable to be changed at any time. The preferred means for causing this variation in the rate of operation of the meter constructed in accordance with my present invention consists in the provision of a variable load that is automatically controlled by means of a rheostat controlled by a solenoid or other suitable form of electromagnetic device whose winding is subject to the variable volume of current flowing from the battery. This load is preferably in the form of an electromagnetic drag acting upon a disk coupled with the rotating element of the meter and having a winding subject to the pressure of the battery, the resistance of the rheostat being included in circuit with the winding. By means of the rheostat the force of the drag is decreased to permit the speed of the disk and rotating element of the meter to increase as the rate of discharge increases.

I will explain my invention more fully by reference to the accompanying drawing, which is a diagrammatic view of a storage-battery system with the meter of my invention associated therewith.

In the drawing a storage battery 1 is illustrated having mains 2 and 3. The main 2 is provided with bifurcated branches 4 5, terminating in contacts 6 and 7, while the main 3 terminates in a pivotal mounting 8, upon which a switch-blade 9 of a switch 10 is secured. A second switch-blade 11 of the switch 10 is also placed upon a pivotal mounting 12. Terminals of a charging-circuit 13 and 14 are illustrated. Terminals 15 and 16 of conductors leading to translating means, as the motor of a motor-vehicle, are also illustrated. When the switch 10 is thrown to the left, the charging-machine or source of current is thrown into circuit with the storage battery. When the switch is thrown to the right, the storage battery is thrown into circuit with the translating means.

I have illustrated a meter having a current-winding included in the main 2, this current-winding being subdivided into coils 17 17. The meter is also provided with a pressure-winding 18, included in bridge between the battery leads or mains. These windings of the meter are constantly in circuit with the battery irrespective of its association with the charging-machine or the translating means. The meter-winding 18 is preferably in the form of an armature and is mounted upon a spindle 19, at the lower end of which is provided a disk 20, arranged within the fields of a damping-electromagnet 21 and a permanent magnet 22, the meter thus constituting a wattmeter, though I do not wish to be limited to this type of instrument. The shaft 19 also carries the commutator 23, against which bear brushes 24 24, that serve to include the armature of the meter in circuit, a choking and adjusting resistance 25 being also included in circuit with the armature.

The meter is provided with gearing at its upper end to actuate the measuring-index 26, which by coöperation with a suitable reading-scale serves to indicate the amount of energy stored in the battery in charging and remaining in the battery in discharging.

The winding of the electrogmagnet 21 is preferably included in series with a choking and adjusting resistance 27 and in bridge of the battery mains or leads to be subject to the battery potential. In accordance with my present invention a rheostat-operating solenoid or electromagnetic device 28 is included, preferably, in series with the winding 17 in the branch 5. The rheostat-arm 28' and the rheostat resistance $28^2$ constitute terminals of the bridge-conductor, including the winding of the braking-electromagnet. As the current discharge from the battery increases the amount of rheostat resistance in circuit with the winding of the braking-electromagnet is increased correspondingly, thus reducing the load of the meter to permit an increase in the rate of operation per unit of load or energy commensurate with the increase in battery discharge. A decrease in battery discharge in like manner causes less resistance to be included in circuit with the braking-magnet to increase the load upon the meter to correspondingly decrease the rate of operation per unit of load or energy. When the switch is thrown to the left in charging the battery, the magnets 21 and 28 are cut out of circuit, the meter-circuit being completed by way of the branch conductor 4.

To compensate for the load removed from the meter by the exclusion of the magnet 21 from circuit, I provide a torque-reducing coil 29, that is included in circuit with the armature when the switch is thrown to the left, so that a reduced torque accompanies the reduced load when the energy that is being stored in the battery is measured.

When the switch is thrown to the right, the branch conductor 4 is disconnected, whereupon the meter-circuit is completed by way of the conductor 5 and the magnet 28. With this adjustment of the switch 10 the torque-reducing resistance 29 is cut out of circuit, both electromagnets 21 and 28 being then included in circuit. As the magnetization due to this winding 28 varies with the amount of current flowing from the battery, the degree that the braking action is reduced will depend upon the rate of battery discharge. A large flow of current, due to a high rate of discharge, will obviously decrease the drag to a proportionately greater extent than a smaller flow of current, due to a lesser rate of discharge, and by proper proportioning and calibration the meter may in this manner be made to compensate for the varying inefficiency of the battery throughout its entire range of operation.

While I have herein shown and particularly described the preferred embodiment of my invention, it is obvious that changes may readily be made without departing from the spirit thereof, and I do not wish, therefore, to be limited to the precise disclosures herein set forth; but,

Having thus described my invention, I claim as new and desire to secure by Letters Patent—

1. The combination with a storage battery, of a meter for measuring energy discharged, a rheostat for governing the rate of operation of the meter, and an electromagnetic device or solenoid for governing the amount of effective resistance in circuit to operate the meter at varying rates of speed per unit of load or energy, according to varying rates of discharge, substantially as described.

2. The combination with a storage battery, of a meter for measuring energy discharged, and means for changing the amount of resistance of a winding of the meter to operate the meter at increased rates of speed per unit of load or energy upon corresponding increases in the rate of discharge of the battery, substantially as described.

3. The combination with a storage battery, of a meter for measuring battery discharge, provided with a damping-disk, a magnet within whose field the said disk is located, and means for changing the resistance of said magnet-winding for decreasing the force of its field upon an increase in the rate of battery discharge to increase the rate of operation of the meter per unit of load or energy, substantially as described.

4. The combination with a storage battery, of a meter for measuring battery discharge, provided with a damping-disk, a braking-magnet within whose field the said disk is located, a rheostat resistance in circuit with the electromagnet-winding, and a governing electromagnetic device or solenoid in series with the battery to vary the rheostat resistance and thereby to vary the rate of operation of the meter per unit of load or energy, according to the battery discharge, substantially as described.

5. The combination with a storage battery, of a meter for measuring battery discharge, provided with a damping-disk, a braking-magnet within whose field the said disk is located, a rheostat resistance in circuit with the electromagnet-winding, a governing electromagnetic device or solenoid in series with the battery to vary the rheostat resistance and thereby to vary the rate of operation of the meter per unit of load or energy, according to the battery discharge, and means for rendering said braking-magnet ineffective when charging the battery, substantially as described.

6. The combination with a storage battery, of a meter for measuring battery discharge, provided with a damping-disk, a braking-magnet within whose field the said disk is located, a rheostat resistance in circuit with the electromagnet-winding, a governing electromagnetic device or solenoid in series with the battery to vary the rheostat resistance and thereby to vary the rate of operation of the meter per unit of load or energy, according to the battery discharge, means for rendering said braking-magnet ineffective when charging the battery, and means for compensating for the removal of the electromagnet, substantially as described.

In witness whereof I hereunto subscribe my name this 20th day of November, A. D. 1901.

THOMAS DUNCAN.

Witnesses:
SAMUEL R. BACHTEL,
FRANK V. NELSON.